(12) United States Patent
Hägg et al.

(10) Patent No.: US 7,308,825 B2
(45) Date of Patent: Dec. 18, 2007

(54) TANK GAUGING SYSTEM

(75) Inventors: Lennart Hägg, Kungsbacka (SE); Lars Ove Larsson, Linköping (SE); Kenneth Adolfsson, Linköping (SE); Olov Edvardsson, Linköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 239 days.

(21) Appl. No.: 11/251,582

(22) Filed: Oct. 14, 2005

(65) Prior Publication Data

US 2007/0084282 A1    Apr. 19, 2007

(51) Int. Cl.
*G01F 23/00* (2006.01)
*G01F 23/284* (2006.01)

(52) U.S. Cl. .................................. 73/290 V; 73/290 R
(58) Field of Classification Search .............. 73/290 V, 73/290 R
See application file for complete search history.

(56) References Cited

U.S. PATENT DOCUMENTS

| | | | | |
|---|---|---|---|---|
| 5,710,552 | A * | 1/1998 | McCoy et al. ......... | 340/870.21 |
| 5,847,567 | A * | 12/1998 | Kielb et al. ................. | 324/642 |
| 5,973,942 | A | 10/1999 | Nelson et al. ................ | 363/21 |
| 6,320,532 | B1* | 11/2001 | Diede ......................... | 342/124 |
| 6,414,625 | B1 | 7/2002 | Kleman ....................... | 342/124 |
| 6,539,794 | B1* | 4/2003 | Otto et al. ................. | 73/290 V |
| 6,843,124 | B2* | 1/2005 | Otto et al. ................. | 73/290 V |
| 2004/0100281 | A1 | 5/2004 | Nilsson ....................... | 324/644 |
| 2006/0137446 | A1* | 6/2006 | Wennerberg et al. ..... | 73/290 V |

FOREIGN PATENT DOCUMENTS

WO    WO 2004-076986    9/2004

OTHER PUBLICATIONS

"International Search Report", PCT/SE2006/001161, filed Oct. 13, 2006, 5 pages.

\* cited by examiner

*Primary Examiner*—Hezron Williams
*Assistant Examiner*—Rodney Frank
(74) *Attorney, Agent, or Firm*—Westman, Champlin & Kelly P.A.

(57) ABSTRACT

A tank gauging system for sensing product parameters of a product contained in a tank is disclosed. The system comprises a microwave-based level gauging unit and a temperature gauging unit. A controller of the system includes an external interface adapted to enable communication between the tank gauging system and an external control system; processing circuitry configured for management of communication over the external interface; and a power supply, which is enclosed in an explosion-proof housing and configured to supply intrinsically safe power to the gauging units, wherein the power supply has an essentially rectangular output characteristic. Further, an intrinsically safe two-wire bus connecting the controller and the gauging units is provided, wherein the two-wire bus is usable both for transmitting measurement signals related to the sensed product parameters from the gauging units to the controller and for providing intrinsically safe power from the controller to the gauging units.

47 Claims, 4 Drawing Sheets

TANK GAUGING SYSTEM

TECHNICAL FIELD OF THE INVENTION

The present invention relates to a tank gauging system for sensing product parameters of a product contained in a tank.

The invention further relates to a method of sensing product parameters of a product contained in a tank.

TECHNICAL FIELD

Systems for measuring properties of products contained in tanks or vessels—so-called tank gauging systems—are ubiquitous in application areas involving handling, shipping and storing of products as well as, for example, in the chemical process industry.

Since products to be monitored and/or measured are often hazardous, special safety requirements exist for equipment, such as tank gauging systems or at least parts thereof that are positioned within a so-called hazardous area. Such equipment generally needs to be certified as either explosion-proof or intrinsically safe.

For intrinsically safe equipments there are limitations to ensure that the equipment is unable to cause ignition of a gas, which may be present in the hazardous area.

A representative area of application of tank gauging systems is in a storage facility for petroleum products and the like, often referred to as a "tank farm". In such a tank farm, each tank is typically equipped with a number of sensing unit, each configured to measure a certain property, such as level, temperature, pressure, etc of the product contained in that tank.

Traditional intrinsically safe systems for hazardous environments are mainly analog so-called 4-20 mA systems, in which sensing units are connected in a point-to-point fashion to a central host via intrinsically safe barriers in order to provide intrinsic safety within the hazardous area.

It is easily understood that traditional 4-20 mA systems require a great deal of wiring. Especially for an application such as a tank farm in which the tanks can be separated by considerable distances, the wiring, together with the large number of intrinsically safe barriers needed, stands for a substantial portion of the cost of installing the tank gauging system.

One method of reducing the amount of wiring in an intrinsically safe system is to use a digital intrinsically safe communication bus. Using such a bus, various sensors may be connected along the bus, and it is sufficient to route one cable from a number of sensors to a control room. An example of such a digital communication bus is the HART-bus where up to 15 sensors can be connected on one bus segment.

To further reduce the necessary wiring, it is desired to use the communication bus for supplying power to the sensors as well as for communication. This is for many types of sensors not a big problem, since they often have such a low power consumption that a number of sensors can be supplied without compromising the intrinsic safety.

For microwave based level gauges, however, power consumption is generally above what can be certified as intrinsically safe. Therefore, microwave-based level gauges comprised in currently available tank gauging systems are either not intrinsically safe and protected by an explosion-proof enclosure, or intrinsically safe, but requiring a separate intrinsically safe power supply. Both these methods lead to increased cost for the user—either due to the fact that explosion-proof enclosures are more expensive than intrinsically safe solutions, or because separate power cables need to be installed.

There is thus a need for an improved tank gauging system for use in hazardous environments.

OBJECTS OF THE INVENTION

In view of the above-mentioned and other drawbacks of the prior art, a general object of the present invention is thus to provide an improved tank gauging system for use in hazardous environments.

An object of the present invention is to reduce the required wiring for a tank gauging system.

A further object of the present invention is to enable a cost-reduction for a user of a tank-gauging system.

SUMMARY OF THE INVENTION

According to a first aspect of the invention, these and other objects are achieved through a tank gauging system, for sensing product parameters of a product contained in a tank, comprising a microwave-based level gauging unit configured to sense a level of the product in the tank through reflection of microwave energy, a temperature gauging unit configured to sense a temperature of the product in the tank, a controller including an external interface adapted to enable communication between the tank gauging system and an external control system, processing circuitry configured for management of communication over the external interface, and a power supply, which is enclosed in an explosion-proof housing and configured to supply intrinsically safe power to the gauging units, said power supply having an essentially rectangular output characteristic, wherein the tank gauging system further comprises an intrinsically safe two-wire bus connecting the controller and the gauging units, wherein the two-wire bus is usable both for transmitting measurement signals related to the sensed product parameters from the gauging units to the controller and for providing intrinsically safe power from the controller to the gauging units. In the context of this application, "external control system" refers to a system capable of at least partly controlling operation of the tank gauging system of the present invention. Such an external control system may, for example, be adapted to control several tank gauging systems, wherein each tank gauging system is configured to sense product parameters of a product contained in a specific tank. Of course, a tank gauging system may also be installed such that product parameters of several products contained in a tank can be sensed.

The external control system may, for example, be implemented as a central host computer to which a number of tank gauging systems are connected via a communications channel. Over this communications channel, communication may take place according to one of various possible communication protocols.

By "intrinsically safe" should here be understood protected through an explosion protection method according to the current standard IEC 60019-11 or corresponding subsequent standards, which allows flammable atmosphere to come in contact with electrical equipment without introducing a potential hazard. The electrical energy available in intrinsically safe circuits is restricted to a level such that any spark or hot surfaces which occur as a result of electrical faults are too weak to cause ignition. By a power supply having an "essentially rectangular output characteristic" should in the context of the present application be understood a power supply capable of supplying electric power, which is essentially limited by a maximum output current and a maximum output voltage, such that an area in a voltage-current diagram limited by the maximum output current and the maximum output voltage is essentially rectangular.

As explained in the technical background above, the amount of available power is a problem if one wants to design an intrinsically safe microwave based tank gauging system with a single two-wire bus.

The available power is determined by the allowed maximum current and voltage that may be sufficient to ignite a particular explosive gas. This means that the voltage and current that may arise under a certain error condition must be held below specified limits for a particular gas.

The temperature gauging unit may advantageously comprise fault tolerance enhancing means in order to enable safe penetration into an interior of the tank.

The "fault tolerance enhancement means" are means for ensuring that intrinsic safety is maintained even if a number of failures should occur. A non-limiting example of such fault tolerance enhancement means is a so-called zener-barrier, comprising several zener-diodes in parallel.

Through the provision according to the present invention of fault tolerance enhancement means, safety is increased even further in especially safety-critical areas, such as the interior of the tank or in the vicinity of hatches which are sometimes opened.

It has now been surprisingly found by the current inventors that an amount of intrinsically safe power sufficient to power a tank gauging system may be supplied via a two-wire communication bus.

This is accomplished, according to the first aspect of the present invention, through the provision of an intrinsically safe power supply having an essentially rectangular output characteristic.

The two-wire communication bus may preferably be a digital communication bus.

Separate wiring for power may thus be avoided and the need for explosion-proof barriers around microwave-based level gauges may be alleviated. Installation and procurement costs may thereby be considerably reduced.

Furthermore, the tank gauging system according to the present invention facilitates addition of further sensing units to the two-wire bus. Scalable systems including at least one microwave-based level gauge may therefore be realized which require only minimal intervention to add an additional sensing unit to the tank gauging system.

The intrinsically safe power supply comprised in the tank gauging system according to the present invention may be configured to supply at least 1.5 W of intrinsically safe power.

Through this power supply configuration, a sufficient amount of power may be supplied for bus-powering of a microwave-based level gauging unit and a temperature gauging unit, while at the same time ensuring intrinsic safety.

Preferably, the processing circuitry comprised in the controller may further be configured to process data obtained from at least one of said gauging units.

Through this configuration, intelligent tank gauging systems may be provided, which are able to provide to the external control system not only raw data, but measurement data which has been processed in various ways.

Such processing may include aggregation of measurement data obtained from a gauging unit, to, for example, facilitate statistical analysis, and combination of measurement data from two or more gauging units. The processing may result in data indicative of parameters, such as a level, a volume, a density or combinations thereof. This resulting data may be provided to the external control system.

According to one embodiment of the tank gauging system of the present invention, the intrinsically safe two-wire bus may be configured to enable digital communication at a rate greater than 5 kbit/s and, advantageously at a rate greater than 25 kbit/s.

Compared to the traditional 4-20 mA HART-systems, use of a higher speed digital communication bus enables communication with higher accuracy as well as communication of more information than just a sensed parameter. This means that additional information, such as a measure indicative of the quality of the sensed value or device diagnostics can be transmitted over the communications channel.

According to another embodiment of the present invention, the microwave-based level gauge unit may be adapted to emit continuous signals, and the microwave-based level gauge unit may comprise processing circuitry adapted to determine the tank level based on a phase difference between a received echo signal and a reference signal.

Through this per se known so-called FMCW (Frequency Modulated Continuous wave) configuration, the microwave-based level gauge unit is generally capable of very accurate level measurements while requiring relatively much power compared to other types of sensing units. It has been surprisingly found by the present inventions that a tank gauging system according to the invention could be realized in which enough intrinsically safe power could be delivered over the bus to power the FMCW-microwave-based level gauge unit. Thereby, the measurement accuracy of the FMCW-microwave-based level gauge unit could be added to the other advantages of the tank gauging system according to the present invention as mentioned above.

According to a further embodiment of the present invention, the microwave-based level gauge unit may be adapted to emit pulsed signals, wherein the microwave-based level gauge unit comprises processing circuitry adapted to determine the level of product in the tank based on the time between emission of a pulsed signal and reception of an echo of the signal. A microwave based level gauge using a pulsed signal generally has a lower power consumption than the above-mentioned FMCW-microwave-based level gauge unit, while typically not being capable of delivering the same measurement accuracy. The use of a pulsed microwave based level gauge unit thereby provides for a larger margin in a power budget of the tank gauging system. This added power can be spent on including an additional microwave-based level gauge unit or other sensing units in the tank gauging system.

The management of communication according to the first aspect of the present invention may include converting signals between an external communication protocol and an internal communication protocol.

Hereby, the tank gauging system according to the invention can be adapted to function together with an external control system communicating using a different communication protocol than that used within the tank gauging system.

Preferably, this management of communication may include converting signals between each of a plurality of external communication protocols and an internal communication protocol.

Through this ability, the tank gauging system according to the invention becomes useful in an even wider variety of application areas.

The internal communication protocol of the tank gauging system may advantageously conform to an established industry standard, such as H1 Fieldbus.

The controller comprised in the tank gauging system according to the present invention may be configured for each of a plurality of external interfaces, each being adapted to connect the tank gauging system to the control system via a corresponding external communication link.

Different application areas or installation locations may, as well as supporting different communication protocols, present different physical interfaces to the tank gauging system of the invention. By configuring the controller for a plurality of external interfaces likely to be confronted upon installation, the tank gauging system according to the invention may be implemented in an even wider variety of application areas and environments. This functionality may, for example, be realized by enabling external connection of the tank gauging system via interchangeable adapter circuitry.

Automatic Configuration

According to one embodiment of the tank gauging system of the present invention, the processing circuitry included in the controller may be adapted to recognize and automatically configure at least one of the first and second sensing units.

By configuring the tank gauging system according to the present invention such that recognition and automatic configuring of at least one of the connected sensing units is enabled, the system can be made considerably more user-friendly and efficient compared to prior art systems.

This automatic configuration may include configuring a functional connection between the first and second sensing units.

The automatic configuration may further include configuring a flow of information between the at least one of the first and second sensing units and the controller and between the first and second sensing units.

Through this type of automatic configuration, including configuration data for a sensing unit as well as information regarding the functional connection of this sensing unit to other sensing unit and other sensing units, and data regarding the flow of information, the functionality of the tank gauging system as a whole as well as of the sensing units may be considerably increased.

For example, a microwave-based level gauge unit may be configured to collect temperature information from a temperature sensing unit in order to determine a more accurate filling level of product in the tank. This filling level can then be requested by the external control system directly from the microwave-based level gauge unit via the controller. Alternatively, the microwave-based level gauge unit may report the filling level data to the controller, which may in turn store the data until requested by the external control system or, if permitted by the external control system, transmit the data to the host computer.

To this end, the controller may further comprise a memory configured to store an ID and configuration data for at least one of the first and second sensing units.

As also described above, this configuration data may, apart from configuration data for a particular sensing unit, comprise information regarding the functional connection between the sensing unit and other sensing units as well as data regarding the flow of information between the sensing unit and other sensing units and the controller, respectively.

The ID and configuration data may be stored as a database/look-up-table in the memory. When a new sensing unit is connected to the tank gauging system, it would transmit its ID to the controller, which would in turn send the corresponding configuration data to the new sensing unit.

ID and configuration data for new compatible sensing units may be received from the new sensing units upon connection or, alternatively, be added to the memory from the central host computer or via a user interface connected to the controller.

Hereby, ID and configuration data for new devices can be added at any time and configuration data for already connected devices may be changed if desired.

Sensing units from multiple manufacturers can be used within the same system.

The microwave-based level gauge unit comprised in the tank gauging system according to the present invention, may comprise a transmitter for transmitting measuring signals towards a surface of the product in the tank, a receiver for receiving echo signals from the tank, and processing circuitry for determining the level or the product in the tank based on the received echo signal.

Through this configuration of the microwave-based level gauge unit, the microwave-based level gauge unit may independently determine the level of product in the tank, without any intermediate calculation being performed by the processing circuitry in the controller or any other processing circuitry external to the microwave-based level gauge unit. Hereby, less information needs to be communicated over the bus and, since the processing circuitry in the controller can be dedicated to managing communication, a more flexible tank gauging system can be realized.

The tank gauging system may further comprise at least a third sensing unit configured to sense at least one of level, temperature, pressure, flow, density, pH, conductivity and viscosity, or a combination thereof.

According to a second aspect of the invention, the above-mentioned and other objects are achieved through a tank gauging system, for sensing product parameters of a product contained in a tank, comprising a microwave-based level gauging unit configured to sense a level of the product in the tank through reflection of microwave energy, a temperature gauging unit configured to sense a temperature of the product in the tank, a controller including an external interface adapted to enable communication between the tank gauging system and an external control system, processing circuitry configured for management of communication over the external interface, and a power supply, which is enclosed in an explosion-proof housing and configured to supply intrinsically safe power to the gauging units, said power supply being configured to supply at least 1.5 W of intrinsically safe power, and an intrinsically safe two-wire bus connecting the controller and the gauging units, wherein the two-wire bus is usable both for transmitting measurement signals related to the sensed product parameters from the gauging units to the controller and for providing intrinsically safe power from the controller to the gauging units.

Through the provision according to this second aspect of the invention of an intrinsically safe power supply being configured to supply at least 1.5 W of intrinsically safe power, it has been surprisingly found that a tank gauging system comprising a microwave-based level gauging unit and a temperature gauging unit may be powered via a two-wire communication bus.

Separate wiring for power may thus be avoided and the need for explosion-proof barriers around microwave-based level gauges may be alleviated. Installation and procurement costs may thereby be considerably reduced.

Further effects analogous to those described above in connection with the first aspect of the invention are also obtained through this second aspect of the present invention.

According to a third aspect of the invention, the above-mentioned and other objects are achieved by a method of sensing product parameters of a product contained in a tank, comprising the steps of providing a microwave-based level gauge unit configured to sense a level of the product in the tank through reflection of microwave energy, providing a controller adapted to enable communication to an external control system, connecting the microwave-based level gauge unit and the controller by means of an intrinsically safe two-wire bus, and using the two-wire bus both for transmitting measurement signals related to the sensed level of the product from the microwave-based level gauge unit to the controller and for providing intrinsically safe power from the controller to the microwave-based level gauge unit, wherein the intrinsically safe power is provided according to an essentially rectangular output characteristic.

The method according to the present invention may further comprise the step of providing at least one additional sensing unit configured to sense an additional product parameter.

Further effects analogous to those described above in connection with the first aspect of the invention are also obtained through this third aspect of the present invention.

According to a fourth aspect the above-mentioned and other objects are achieved by a tank gauging system for sensing product parameters of a product contained in a tank, comprising a microwave-based level gauging unit configured to sense a level of said product in the tank through reflection of microwave energy, at least one additional gauging unit configured to sense at least one additional product parameter, a controller including an external interface adapted to enable communication between said tank gauging system and an external control system, processing circuitry configured for management of communication over said external interface, and a power supply configured to supply intrinsically safe power to said gauging units, said power supply having an essentially rectangular output characteristic, and an intrinsically safe two-wire bus connecting said controller and said gauging units, wherein the two-wire bus is usable both for transmitting measurement signals related to the sensed product parameters from the gauging units to the controller and for providing intrinsically safe power from the controller to the gauging units, wherein said microwave-based level gauging unit includes at least a first and a second measuring channel, each having a transmitter for transmitting microwave energy towards said product in the tank and a receiver for receiving reflected microwave energy, wherein microwaves used in said first measuring channel are distinguishable from microwaves used in said second measuring channel.

Advantageous effects analogous to those described above in connection with the first aspect of the invention are also obtained through this fourth aspect of the present invention. Specifically, it has proven advantageous to use microwave-based level gauging units including two measuring channels within the above-discussed system architecture and method. Such level gauging units are per se known from U.S. Pat. Nos. 6,414,625 and 6,765,524 by the same applicant, said patents hereby incorporated by reference.

BRIEF DESCRIPTION OF THE DRAWINGS

For exemplifying purposes, these and other aspects of the present invention will now be described in more detail, with reference to the appended drawings showing a currently preferred embodiment of the invention, wherein.

DETAILED DESCRIPTION OF PREFERRED EMBODIMENTS OF THE INVENTION

Figure 1:
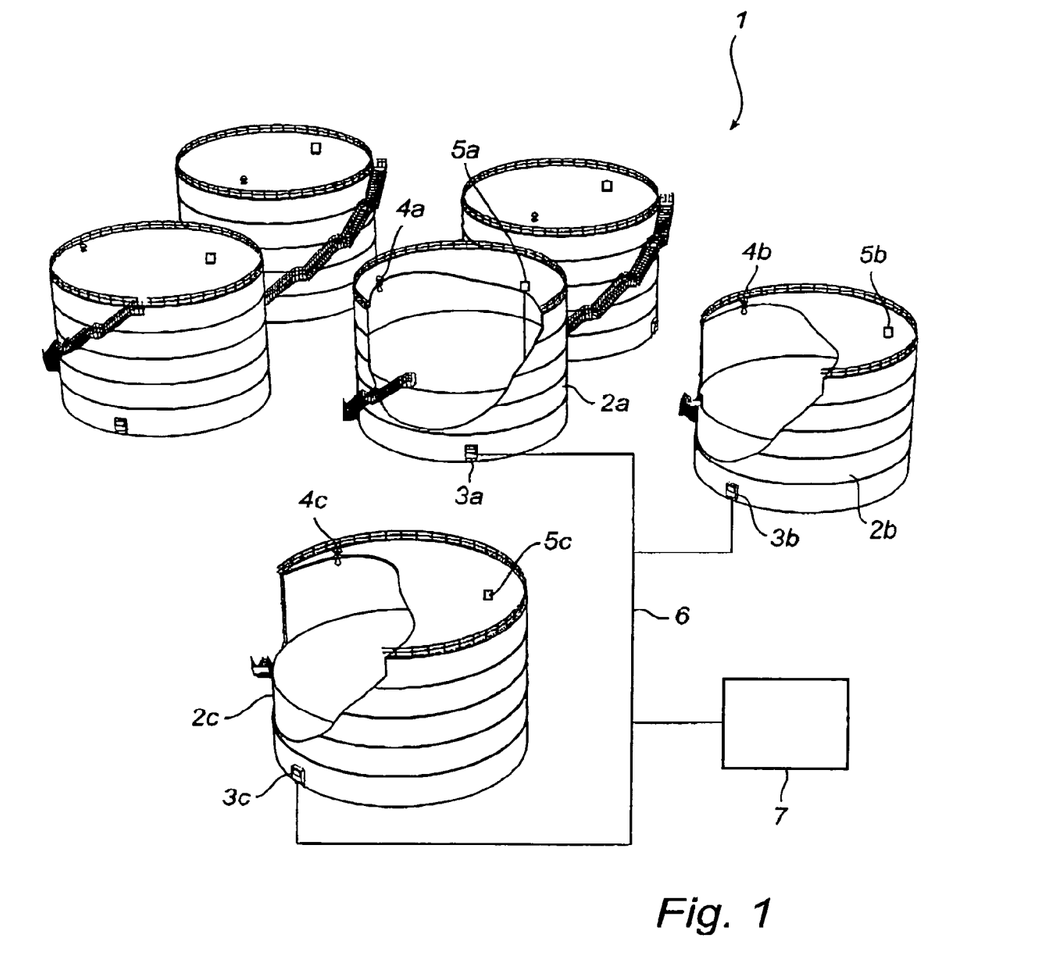
FIG. 1 schematically illustrates an exemplary application for a tank gauging system according to the present invention.

FIG. 1 shows a tank farm 1 as an example of a typical area of application for the tank gauging system according to the present invention.

In FIG. 1, by way of example, three tanks 2a-c are each shown to be equipped with a tank gauging system, including a controller, here shown as a separate control unit 3a-c, a microwave-based level gauge unit 4a-c and a temperature sensing unit 5a-c. The tank gauging systems are, via an external system bus 6, connected to a host computer 7, which is configured to control the levels and other parameters of the products contained in the tanks 2a-c.

Figure 2:
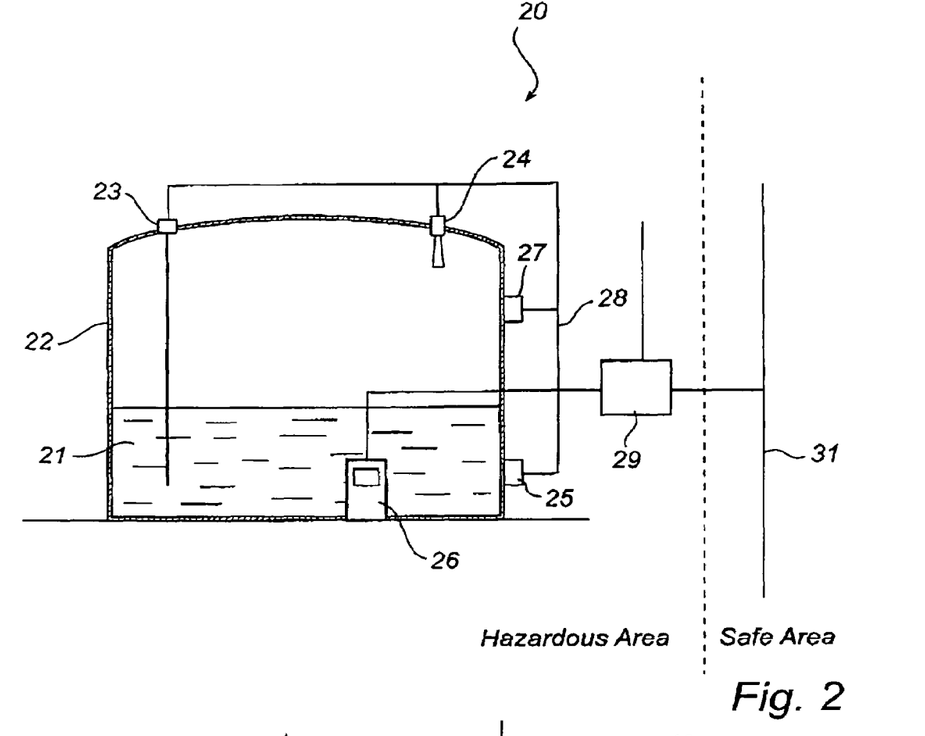
FIG. 2 is a schematic illustration of a tank gauging system according to the present invention.

With reference to FIG. 2, the tank gauging system 20 according to the invention will now be described.

In FIG. 2, a tank 22 containing a product 21 and equipped with the tank gauging system according to the invention 20 is shown. Here, a temperature sensing unit 23, a microwave-based level gauge unit 24, a pressure sensing unit 25, a display unit 26 and a hub 27, for connection of additional sensing units configured for the traditional 4-20 mA-system to the tank gauging system 20, are connected via a two-wire intrinsically safe bus 28 to a controller 29. The controller 29 is connected to an external control system bus 31. All units 23-27 connected to the two-wire intrinsically safe bus 28 are powered via the bus 28. The tank gauging system receives external power through a power line 30.

Typically, the controller 29 is enclosed in an explosion-proof housing and thereby made suitable for use within the hazardous area in the vicinity of the tank 22.

Figure 3:
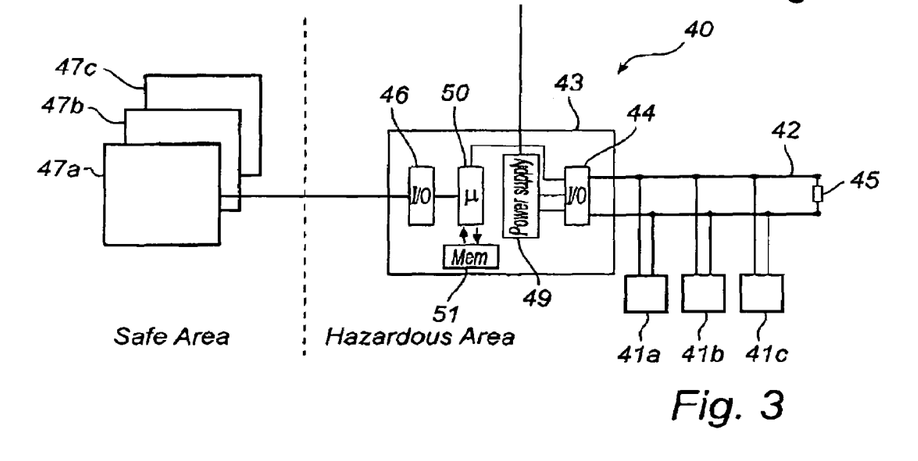
FIG. 3 is a functional block diagram of a tank gauging system according to a preferred embodiment of the first aspect of the present invention.

In FIG. 3, a functional block diagram of a tank gauging system 40 according to a preferred embodiment of the invention is shown. Here, three sensing units 41a-c, including a microwave-based level gauging unit and a temperature gauging unit, are connected in parallel via an intrinsically safe two-wire bus 42 to a controller 43 via an internal interface 44. The bus 42 is suitably terminated with terminating circuitry 45. The controller 43 further has an external interface 46 for connection of the tank gauging system 40 to an external control system operating according to one of various communication configurations 47a-c here illustrated in the form of three different configurations.

The controller 43 additionally includes an power supply 49 capable of delivering intrinsically safe power, processing circuitry 50 configured for management of communication over the external interface, and a memory 51.

Figure 4:
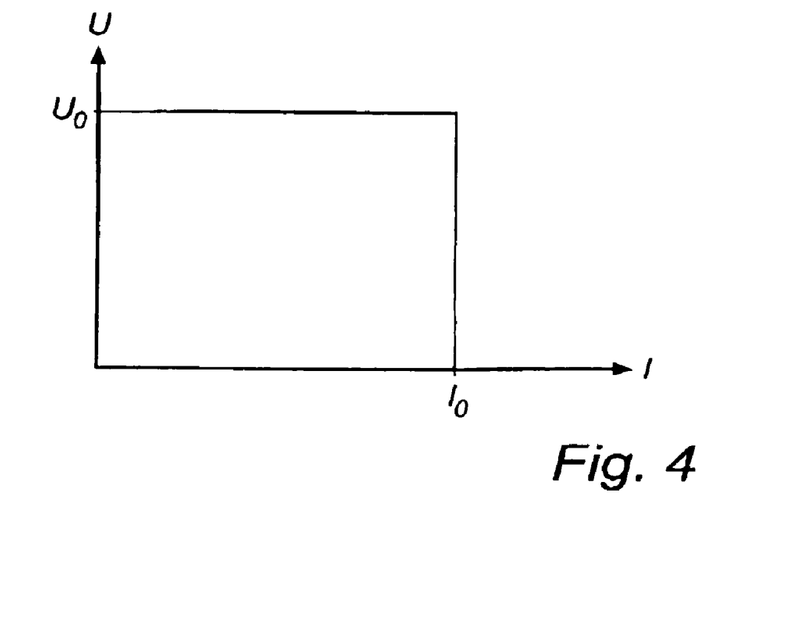
FIG. 4 is a diagram schematically illustrating a power supply characteristic according to the first aspect of the invention.

The power supply 49, which receives external power through a power line 48, has a rectangular output characteristic as is schematically illustrated in FIG. 4. Through this output characteristic, a sufficient amount of power can be supplied to the sensing units 41a-c, while still fulfilling the requirements on intrinsically safe power.

As shown in FIG. 4, the power supply 49 is capable of delivering a maximum voltage $U_o$ and a maximum current $I_o$.

Suitably, the the power supply 49 is capable of supplying more than 1.5 W of intrinsically safe power to the sensing units comprised in the tank gauging system.

Two different communication configurations may differ in communication protocol as well as in physical parameters such as wiring, signalling levels etc. Furthermore, it should be understood that the tank gauging system according to the invention may be connected to a far greater number of different communication configurations than those 47a-c shown here.

In order to be able to communicate over the various communication configurations 47a-c, the processing circuitry 50 in the controller 43 is adapted to emulate each of these communication configurations. In order to handle the physical connection to the various communication configurations, the controller is adapted to enable connection via adapter boards (not shown).

Figure 5:
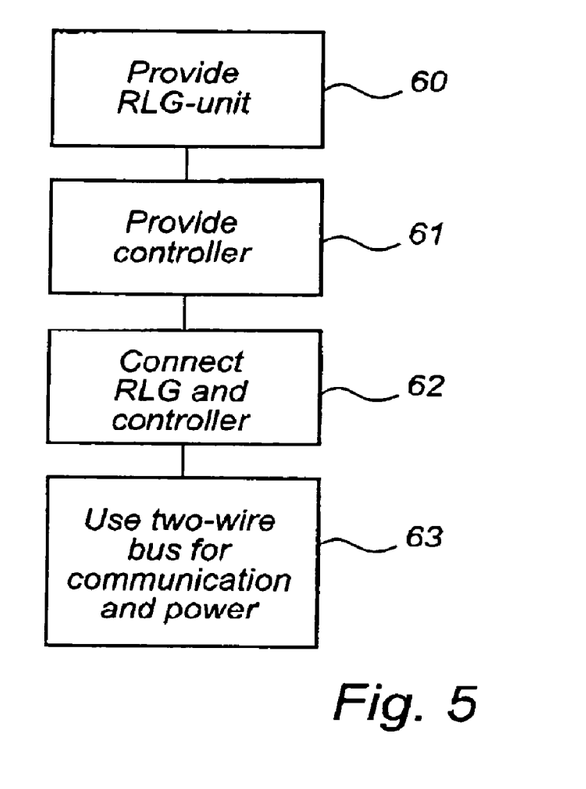
FIG. 5 is a schematic flow-chart illustrating the method of sensing product parameters according to the second aspect of the present invention.

FIG. 5 shows a schematic flow-chart illustrating the method, for sensing product parameters, according to the invention.

In first steps 60 and 61, a microwave-based level gauge unit and a controller are provided. In a subsequent step 62 the microwave-based level gauge unit and the controller are connected by means of an intrinsically safe two-wire bus, which in a following step 63 is used both for transmitting measurement signals, related to the sensed product level, from the microwave-based level gauge unit to the controller and for providing intrinsically safe power from the controller to the microwave-based level gauge unit.

Auto-configuration

Figure 6:
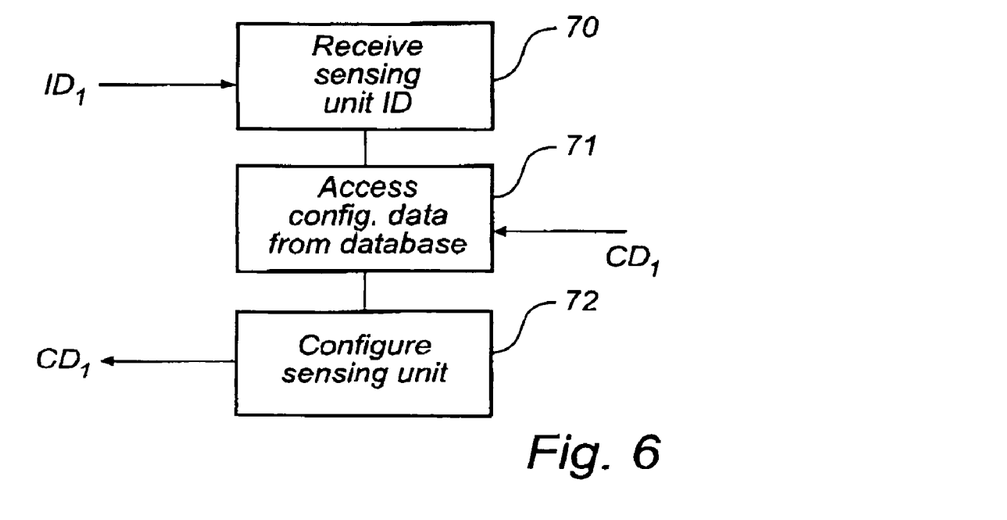
FIG. 6 is a schematic flow-chart illustrating a first embodiment of a method for automatic configuration of sensing units in the tank gauging system according to the invention.

With reference now to FIG. 3, sensing units 41a-c connected to the intrinsically safe two-wire bus 42 typically need to be configured. It is of great benefit to a user of the tank gauging system 40 if the system could configure itself automatically. FIGS. 5 and 6 schematically show two embodiments of methods for automatically configuring the tank gauging system 40 according to a preferred embodiment of the invention.

According to the first embodiment, shown in FIG. 6, a first ID-code $ID_1$ identifying a first sensing unit is, in a first step 70 received by the processing circuitry 50 via the internal interface 44. In a subsequent step 71, configuration data $CD_1$ corresponding to the first ID-code $ID_1$ is accessed from a database stored in the memory 51. This configuration data $CD_1$ is, in a following step 72, via the internal interface 44, transmitted over the bus 42 to the first sensing unit 41a. Having receiving the appropriate configuration data $CD_1$, the first sensing unit 41a is now configured for the current implementation. For a changed configuration, new configuration data corresponding to the sensing units 41a-c may be downloaded to the memory 51 via the internal or/and the external interface.

Figure 7:
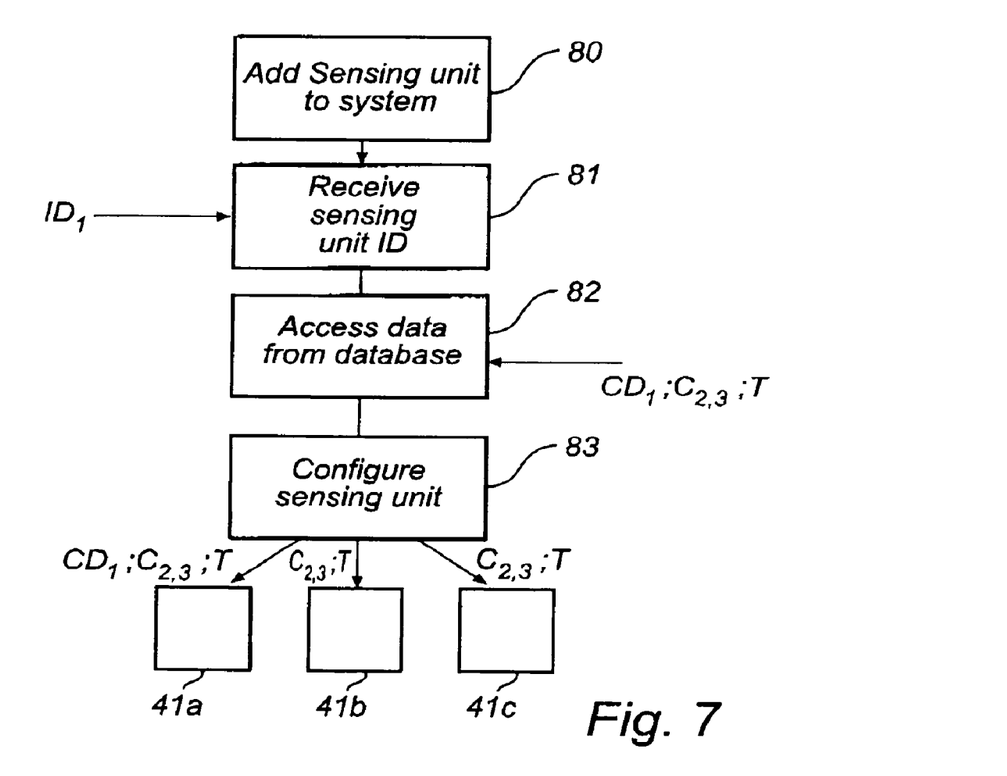
FIG. 7 is a schematic flow-chart illustrating a second embodiment of a method for automatic configuration of sensing units in the tank gauging system according to the invention.

According to the second embodiment, shown in FIG. 7, a new first sensing unit 41a is added 80 to the tank gauging system. In a following step 81, a first ID-code $ID_1$ identifying a first sensing unit 41a is received by the processing circuitry 50 via the internal interface 44. In a subsequent step 82, configuration data $CD_1$, $C_{2,3}$, T corresponding to the first ID-code $ID_1$ is accessed from a database stored in the memory 51. Here, $CD_1$ is data regarding the configuration of the first sensing unit 41a, $C_{2,3}$ is data describing the connections between the first sensing unit 41a and second and third sensing units 41b-c, and T is data describing the flow of information between the first sensing unit 41a and second and third sensing units 41b-c and the controller 43, respectively. In a following step 83, selected portions of this configuration data $CD_1$, $C_{2,3}$, T is, via the internal interface 44, transmitted over the bus 42 to the first, second and third sensing units 41a-c. Having receiving the appropriate configuration data $CD_1$, $C_{2,3}$, T, the tank gauging system 40 is now configured for the current implementation. For a changed configuration, new configuration data corresponding to the sensing units 41a-c may be downloaded to the memory 51 via the internal or/and the external interface.

The person skilled in the art realises that the present invention by no means is limited to the preferred embodiments described above. On the contrary, many modifications and variations arc possible within the scope of the appended claims. For example several other application areas exist, such as on transportable vessels and in process-industry applications. Furthermore, a larger or smaller number of sensing units than in the present description may of course be used. Additionally, the external protocol may be the same as the internal protocol.

What is claimed is:

1. A tank gauging system, for sensing product parameters of a product contained in a tank, comprising:
    a microwave-based level gauging unit configured to sense a level of said product in the tank through reflection of microwave energy;
    a temperature gauging unit configured to sense a temperature of said product in the tank;
    a controller including:
        an external interface adapted to enable communication between said tank gauging system and an external control system;
        processing circuitry configured for management of communication over said external interface; and
        a power supply, which is enclosed in an explosion-proof housing and configured to supply intrinsically safe power to said gauging units, said power supply having an essentially rectangular output characteristic; and
        an intrinsically safe two-wire bus connecting said controller and said gauging units, wherein the two-wire bus is usable both for transmitting measurement signals related to the sensed product parameters from the gauging units to the controller and for providing intrinsically safe power from the controller to the gauging units.

2. The tank gauging system according to claim 1, wherein at least one of the gauging units comprises fault tolerance enhancing means in order to enable safe penetration into an interior of the tank.

3. The tank gauging system according to claim 1, wherein said power supply is configured to supply at least 1.5 W of intrinsically safe power.

4. The tank gauging system according to claim 1, wherein said processing circuitry is further configured to process data obtained from at least one of said gauging units.

5. The tank gauging system according to claim 1, wherein said intrinsically safe two-wire bus is configured to enable digital communication at a rate greater than 5 kbit/s.

6. The tank gauging system according to claim 4, wherein said rate is greater than 25 kbit/s.

7. The tank gauging system according to claim 1, wherein said microwave-based level gauge unit is adapted to emit continuous signals, and wherein the microwave-based level gauge unit comprises processing circuitry adapted to determine the tank level based on a phase difference between a received echo signal and a reference signal.

8. The tank gauging system according to claim 1, wherein said microwave-based level gauge unit is adapted to emit pulsed signals, and wherein the microwave-based level gauge unit comprises processing circuitry adapted to determine the filling level based on the time between emission of a pulsed signal and reception of an echo of said signal.

9. The tank gauging system according to claim 1, wherein said management of communication includes converting signals between an external communication protocol and an internal communication protocol.

10. The tank gauging system according to claim 9, wherein said management of communication includes converting signals between each of a plurality of external communication protocols and an internal communication protocol.

11. The tank gauging system according to claim 9, wherein said internal communication protocol conforms to Fieldbus H1.

12. The tank gauging system according to claim 1, wherein said controller is configured for each of a plurality of external interfaces, each being adapted to connect said tank gauging system to said control system via a corresponding external communication link.

13. The tank gauging system according to claim 1, wherein said processing circuitry is further adapted to recognize and automatically configure at least one of said first and second sensing units.

14. The tank gauging system according to claim 13, wherein said automatic configuration includes configuring a functional connection between said first and second sensing units.

15. The tank gauging system according to claim 14, wherein said automatic configuration includes configuring a flow of information between said at least one of said first and second sensing units and the controller and between said first and second sensing units.

16. The tank gauging system according to claim 13, wherein said controller further comprises a memory configured to store an ID and configuration data for at least one of said first and second sensing units.

17. The tank gauging system according to claim 1, wherein the microwave-based level gauge unit comprises:
a transmitter for transmitting measuring signals towards a surface of the product in the tank;
a receiver for receiving echo signals from the tank; and
processing circuitry for determining the level of said product in the tank based on said echo signal.

18. The tank gauging system according to claim 1, wherein said tank gauging system further comprises at least a third sensing unit configured to sense a third product parameter.

19. The tank gauging system according to claim 18, wherein said third sensing unit is configured to sense at least one of temperature, pressure, flow, density, pH, conductivity and viscosity, or a combination thereof.

20. A tank gauging system, for sensing product parameters of a product contained in a tank, comprising:
a microwave-based level gauging unit configured to sense a level of said product in the tank through reflection of microwave energy;
a temperature gauging unit configured to sense a temperature of said product in the tank;
a controller including:
an external interface adapted to enable communication between said tank gauging system and an external control system;
processing circuitry configured for management of communication over said external interface; and
a power supply, which is enclosed in an explosion-proof housing and configured to supply intrinsically safe power to said gauging units, said power supply being configured to supply at least 1.5 W of intrinsically safe power; and
an intrinsically safe two-wire bus connecting said controller and said gauging units, wherein the two-wire bus is usable both for transmitting measurement signals related to the sensed product parameters from the gauging units to the controller and for providing intrinsically safe power from the controller to the gauging units.

21. The tank gauging system according to claim 20, wherein said temperature gauging unit comprises fault tolerance enhancing means in order to enable safe penetration into an interior of the tank.

22. The tank gauging system according to claim 20, wherein said processing circuitry is further configured process data obtained from at least one of said gauging units.

23. The tank gauging system according to claim 20, wherein said intrinsically safe two-wire bus is configured to enable digital communication at a rate greater than 5 kbit/s.

24. The tank gauging system according to claim 23, wherein said rate is greater than 25 kbit/s.

25. The tank gauging system according to claim 20, wherein said microwave-based level gauge unit is adapted to emit continuous signals, and wherein the microwave-based level gauge unit comprises processing circuitry adapted to determine the tank level based on a phase difference between a received echo signal and a reference signal.

26. The tank gauging system according to claim 20, wherein said microwave-based level gauge unit is adapted to emit pulsed signals, and wherein the microwave-based level gauge unit comprises processing circuitry adapted to determine the filling level based on the time between emission of a pulsed signal and reception of an echo of said signal.

27. The tank gauging system according to claim 20, wherein said management of communication includes converting signals between an external communication protocol and an internal communication protocol.

28. The tank gauging system according to claim 27, wherein said management of communication includes converting signals between each of a plurality of external communication protocols and an internal communication protocol.

29. The tank gauging system according to claim 27, wherein said internal communication protocol conforms to Fieldbus H1.

30. The tank gauging system according to claim 20, wherein said controller is configured for each of a plurality of external interfaces, each being adapted to connect said tank gauging system to said control system via a corresponding external communication link.

31. The tank gauging system according to claim 20, wherein said processing circuitry is further adapted to recognize and automatically configure at least one of said first and second sensing units.

32. The tank gauging system according to claim 31, wherein said automatic configuration includes configuring a functional connection between said first and second sensing units.

33. The tank gauging system according to claim 32, wherein said automatic configuration includes configuring a flow of information between said at least one of said first and second sensing units and the controller and between said first and second sensing units.

34. The tank gauging system according to claim 31, wherein said controller further comprises a memory configured to store an ID and configuration data for at least one of said first and second sensing units.

35. The tank gauging system according to claim 20, wherein the microwave-based level gauge unit comprises:
- a transmitter for transmitting measuring signals towards a surface of the product in the tank;
- a receiver for receiving echo signals from the tank; and
- processing circuitry for determining the level of said product in the tank based on said echo signal.

36. The tank gauging system according to claim 20, wherein said tank gauging system further comprises at least a third sensing unit configured to sense a third product parameter.

37. The tank gauging system according to claim 36, wherein said third sensing unit is configured to sense at least one of temperature, pressure, flow, density, pH, conductivity and viscosity, or a combination thereof.

38. A method of sensing product parameters of a product contained in a tank, comprising the steps of:
- providing a microwave-based level gauge unit configured to sense a level of said product in the tank through reflection of microwave energy;
- providing a controller adapted to enable communication to an external control system;
- connecting said microwave-based level gauge unit and said controller by means of an intrinsically safe two-wire bus; and
- using the two-wire bus both for transmitting measurement signals related to the sensed level of said product from the microwave-based level gauge unit to the controller and for providing intrinsically safe power from said controller to the microwave-based level gauge unit,
- wherein said intrinsically safe power is provided according to an essentially rectangular output characteristic.

39. The method according to claim 38, wherein at least 1.5 W of intrinsically safe power is provided.

40. The method according to claim 38, further comprising the step of:
- providing at least one additional sensing unit configured to sense an additional product parameter.

41. The method according to claim 38, wherein the microwave-based level gauge unit is configured to sense a level of said product in the tank through reflection of microwave energy by means of the substeps:
- transmitting measuring signals towards the surface of the filling material;
- receiving echo signals from the tank; and
- calculating the level of said product in the tank based on said received echo signals.

42. The method according to claim 38, wherein the measuring signals are transmitted continuously, and wherein the level of said product in the tank is determined based on a phase difference between a received echo signal and a reference signal.

43. The method according to claim 38, wherein the measuring signals are transmitted pulsed, wherein the level of the product in the tank is determined based on an elapsed time between emission of a pulsed signal and reception of an echo of said signal.

44. The method according to claim 38, further comprising the steps of:
- connecting the tank gauging system to said external control system; and
- converting signals between an external communication protocol and an internal communication protocol.

45. The method according to claim 38, wherein the controller is adapted to recognize and automatically configure at least one of said sensing units, by means of the sub-steps:
- receiving, from at least one of said sensing units, an ID for said sensing unit; and
- accessing, from a database, configuration data corresponding to said received ID; and
- configuring said at least one sensing unit using said configuration data.

46. The method according to claim 45, wherein said database is stored in a memory comprised in said controller.

47. A tank gauging system, for sensing product parameters of a product contained in tank, comprising:
- a microwave-based level gauging unit configured to sense a level of said product in the tank through reflection of microwave energy;
- at least one additional gauging unit configured to sense at least one additional product parameter;
- a controller including:
  - an external interface adapted to enable communication between said tank gauging system and an external control system;
  - processing circuitry configured for management of communication over said external interface; and
  - a power supply configured to supply intrinsically safe power to said gauging units, said power supply having an essentially rectangular output characteristic; and
- an intrinsically safe two-wire bus connecting said controller and said gauging units, wherein the two-wire bus is usable both for transmitting measurement signals related to the sensed product parameters from the gauging units to the controller and for providing intrinsically safe power from the controller to the gauging units,
- wherein said microwave-based level gauging unit includes at least a first and a second measuring channel, each having a transmitter for transmitting microwave energy towards said product in the tank and a receiver for receiving reflected microwave energy, wherein microwaves used in said first measuring channel are distinguishable from microwaves used in said second measuring channel.

\* \* \* \* \*